United States Patent
Martinchek et al.

(10) Patent No.: US 10,396,370 B2
(45) Date of Patent: Aug. 27, 2019

(54) PASSIVE TORTUOUS PATH DRAIN

(71) Applicant: GM GLOBAL TECHNOLOGY OPERATIONS LLC, Detroit, MI (US)

(72) Inventors: David A. Martinchek, Pontiac, MI (US); Robert C. Thompson, Lockport, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 266 days.

(21) Appl. No.: 15/602,517

(22) Filed: May 23, 2017

(65) Prior Publication Data
US 2018/0342743 A1   Nov. 29, 2018

(51) Int. Cl.
*H01M 8/04119* (2016.01)
*H01M 8/1018* (2016.01)

(52) U.S. Cl.
CPC .......... *H01M 8/04156* (2013.01); *H01M 2008/1095* (2013.01)

(58) Field of Classification Search
CPC ............. H01M 8/04156; H01M 2008/1095
See application file for complete search history.

(56) References Cited

U.S. PATENT DOCUMENTS

| | | | | |
|---|---|---|---|---|
| 6,027,283 | A | * | 2/2000 | Schweinberg ........ E01C 11/227 404/4 |
| 2006/0084174 | A1 | * | 4/2006 | Ogawa .............. B01L 3/502753 436/63 |
| 2018/0320358 | A1 | * | 11/2018 | Chromey ................ E03F 3/046 |

* cited by examiner

*Primary Examiner* — Muhammad S Siddiquee
(74) *Attorney, Agent, or Firm* — Reising Ethington P.C.

(57) ABSTRACT

A passive tortuous path drain for a directing fluid flow from an enclosure includes a drain body having a front face and a back face. The front face defines a curved trenched channel having a first curved channel end and a second curved channel end. The front face also defines a second trenched channel. The drain body defines at least one egress opening in fluid communication with the second trenched channel. The first curved channel end and a second curved channel end are in fluid communication with the second trenched channel. Characteristically, the drain is adapted to be positioned adjacent to a drain opening in an enclosure such that liquid flows from the drain opening to the curved trenched channel and then to the second trenched channel exiting through the egress opening.

17 Claims, 7 Drawing Sheets

PASSIVE TORTUOUS PATH DRAIN

TECHNICAL FIELD

In at least one aspect, the present invention is related to devices for removing water from electronic enclosures, and in particular from electronic enclosures housing a fuel cell stack.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane (i.e., ion conducting membrane) has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles) supported on carbon particles to promote oxidation of hydrogen at the anode, and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL") which in turn are sandwiched between a pair of non-porous, electrically conductive flow field plates. The plates function as current collectors for the anode and the cathode, and contain appropriate channels and openings formed therein for distributing a liquid coolant and the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

During fuel cell operation, water tends to accumulate at the bottom of the enclosure housing such fuel cell stacks (i.e., the wet end). Such water need to be removed so that the fuel cell stack can continue to operate properly. Some prior art solutions to this water accumulation use an active drain to remove water. Active drain systems are expensive and require a valve and water sensor to operate. Moreover, typically these systems only allow drainage at one location. However, automotive fuel cell systems need drainage at multiple locations in order to have efficient drainage when a vehicle is tilted. Other prior art drainage systems uses passive drain valve (e.g., umbrella, Bellville, duckbill) which require precise machining of the housing to function properly. Moreover, these passive drain valves require pressure head to open (up to 50 mm). This requirement can result in freeze issues.

Accordingly, there is a need for simple inexpensive systems for removing water from enclosures housing fuel cell stacks while still maintaining environmental sealing capability.

SUMMARY

In at least one embodiment, the present invention solves one or more problems of the prior art by providing a passive tortuous path drain to remove fluid (e.g., water) from an electronic enclosure such an enclosure housing a fuel cell stack. The passive tortuous path drain includes a drain body having a front face and a back face. The front face defines a curved trenched channel having a first curved channel end and a second curved channel end. The front face also defines a second trenched channel. The drain body defines at least one egress opening in fluid communication with the second trenched channel. The first curved channel end and a second curved channel end are in fluid communication with the second trenched channel. Characteristically, the drain is adapted to be positioned adjacent to a drain opening in an enclosure such that liquid flows from the drain opening to the curved trenched channel and then to the second trenched channel exiting through the egress opening.

In another embodiment, an electronic system that includes the passive tortuous path drain set forth herein is provided. The electronic system includes electronic components, an enclosure that houses the electronic components; and the passive tortuous path drain.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Figure 1A:
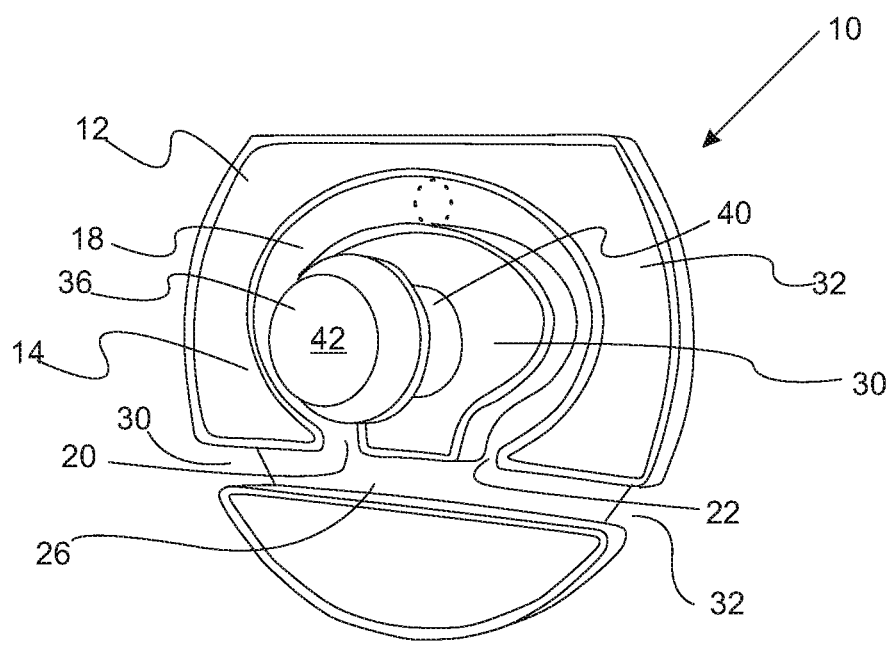
FIG. 1A is a front perspective view of a passive tortuous path drain.
Figure 1B:
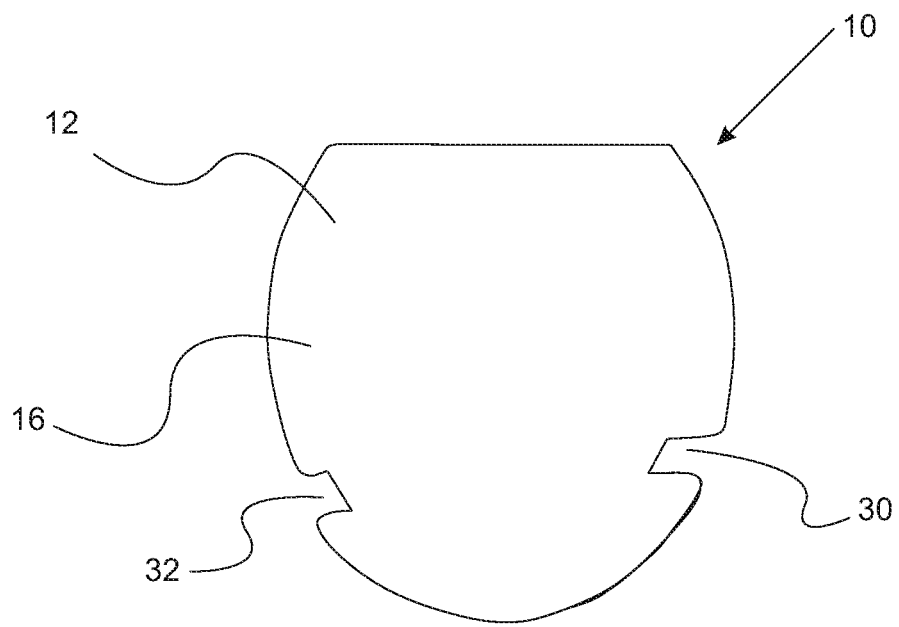
FIG. 1B is a rear perspective view of the passive tortuous path drain of FIG. 1A.

With reference to FIG. 1, a perspective view of a passive tortuous path drain for removing a liquid (e.g., condensed water) from an electronic enclosure is provided. Passive tortuous path drain 10 includes a drain body 12 having a front face 14 and a back face 16. The front face defines a curved trenched channel 18 having first curved channel end 20 and second curved channel end 22. The front face 14 also defines second trenched channel 26. The drain body defines at least one egress 30 opening in fluid communication with the second trenched channel 26. In FIGS. 1A and 1B, a variation in which drain body defines two egress opening 30, 32 within second trench channel 26 is depicted. The first curved channel end 20 and a second curved channel end 22 are in fluid communication with the second trenched channel 26. Characteristically, the drain 10 is adapted to be positioned adjacent to a drain opening in an enclosure such that liquid flows from the drain opening to the curved trenched channel and then to the second trenched channel exiting through the egress opening.

Still referring to FIGS. 1A and 1B, the curved trench channel 18 can be an open sided U-shaped trench. In particular, curved trenched channel 18 can have a looped shape that defines a central elevated section 30 and a peripheral elevated section 32. Retention feature 36 extends from central elevated section 30. Retention feature 36 holds drain 10 to an electronic enclosure as set forth below in more detail. In particular, retention feature 36 is adapted to be held in a retention hole in the enclosure by being positionable in such a retention hole. In a refinement, retention feature 36 includes a shaft section 40 and a head section 42. Characteristically, head section 42 has a larger diameter than the shaft section 40.

Figure 2A:
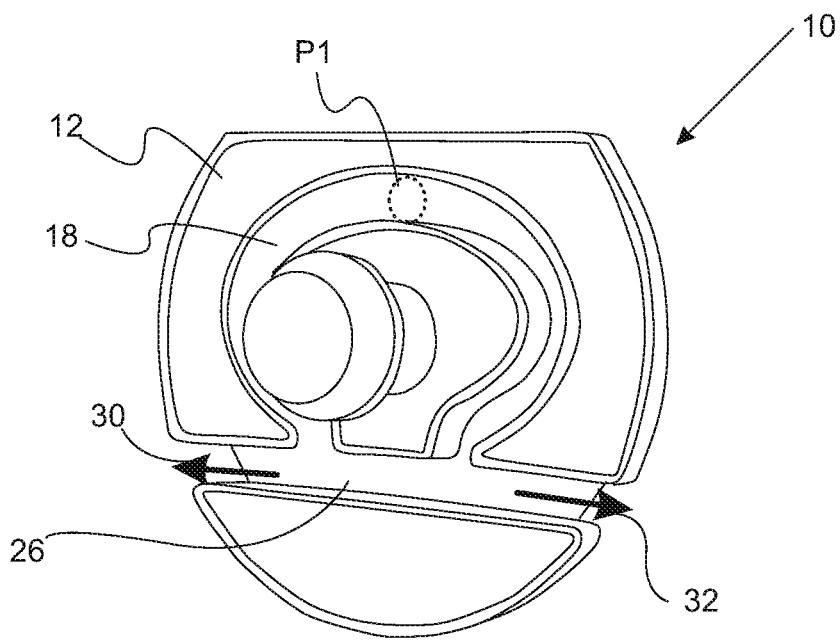
FIG. 2A is a front perspective view of a passive tortuous path drain showing the path followed by water exiting from an electronic component enclosure.
Figure 2B:
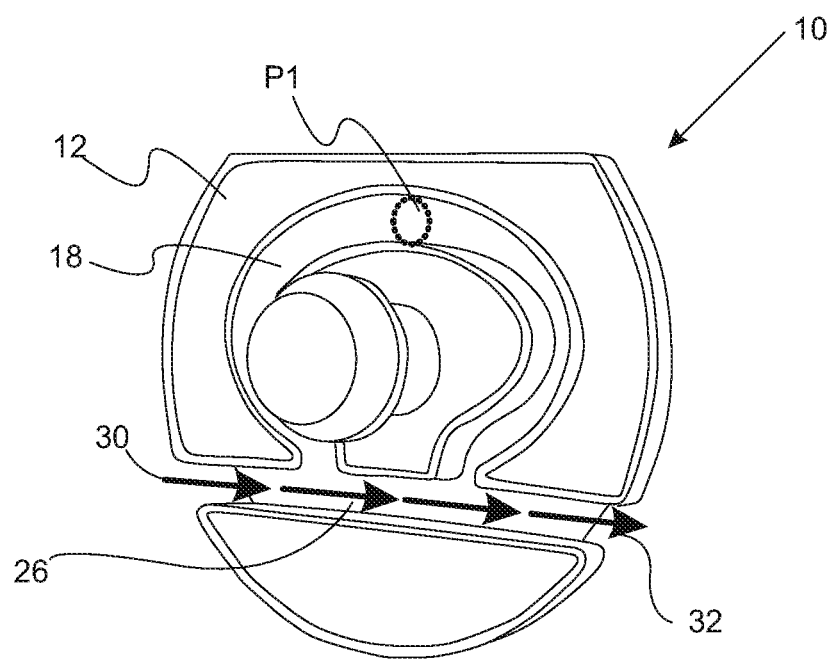
FIG. 2B is a front perspective view of a passive tortuous path drain showing the path followed by water introduced into an egress opening showing that water doesn't enter the electronic component enclosure.

With reference to FIGS. 2A and 2B, operation of the drain is illustrated. As depicted in FIG. 2A, liquid (e.g., water) from an enclosure enters curved trench channel 18 at a position P1 which is between first curved channel end 20 and second curved channel end 22. Such liquid flow to second trenched channel 26 where it continues on to egress openings 30, 32 as indicated by the arrows. The liquid exits through the egress openings. As shown in FIG. 2B, liquid blown into egress opening 30 exits egress opening 32 as indicated by the arrows without being able to travel though curved trench channel 18 and enter an enclosure to which drain 10 is attached.

Figure 3A:
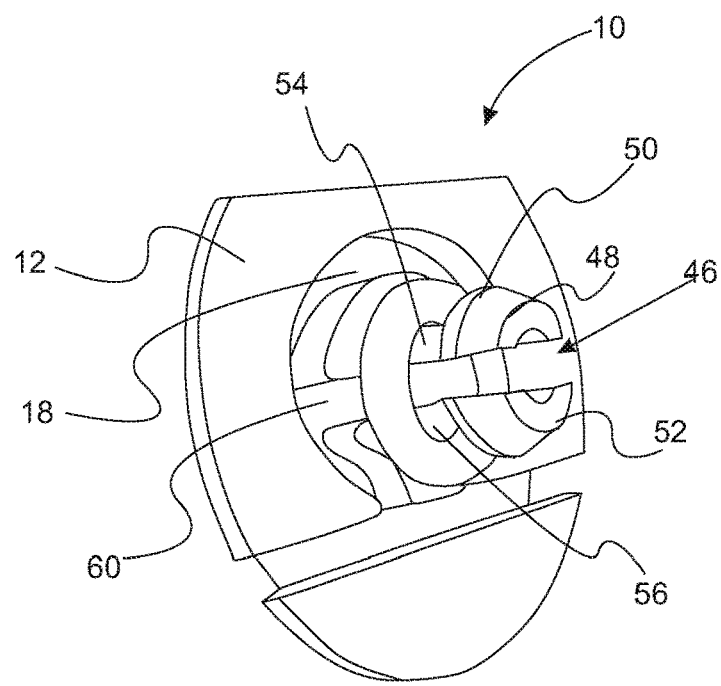
FIG. 3A is a front perspective view of a passive tortuous path drain having a split retention feature.
Figure 3B:
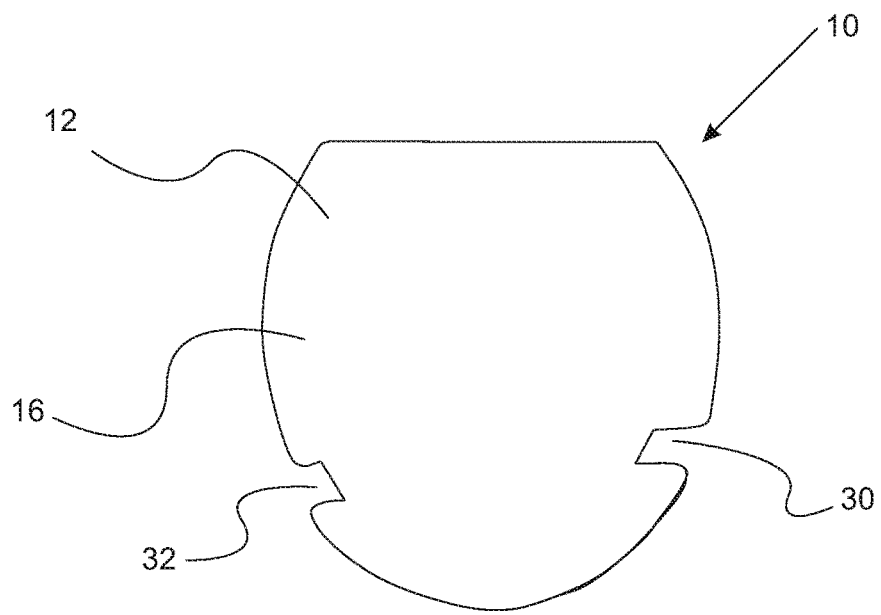
FIG. 3B is a rear perspective view of the passive tortuous path drain of FIG. 3A.

With reference to FIGS. 3A and 3B, perspective views of a drain with a split retention feature are provided. In this refinement, retention feature 46 is split into first retention section 48 and second retention section 50. First retention section 48 and the second retention section 50 each respectively have head sections 52, 54 and shaft sections 56, 58. In a further refinement, drain body 12 further defines a connecting trenched channel 60 connecting two sections of the curved trenched channel 18. In such refinements, first retention section 48 is positioned on first side 62 of the connecting trenched channel 60 and second retention section 50 is positioned on second side of connecting trenched channel 60. O-ring disposed 62 is simultaneously disposed over the shaft sections 56, 58.

Figure 4A:
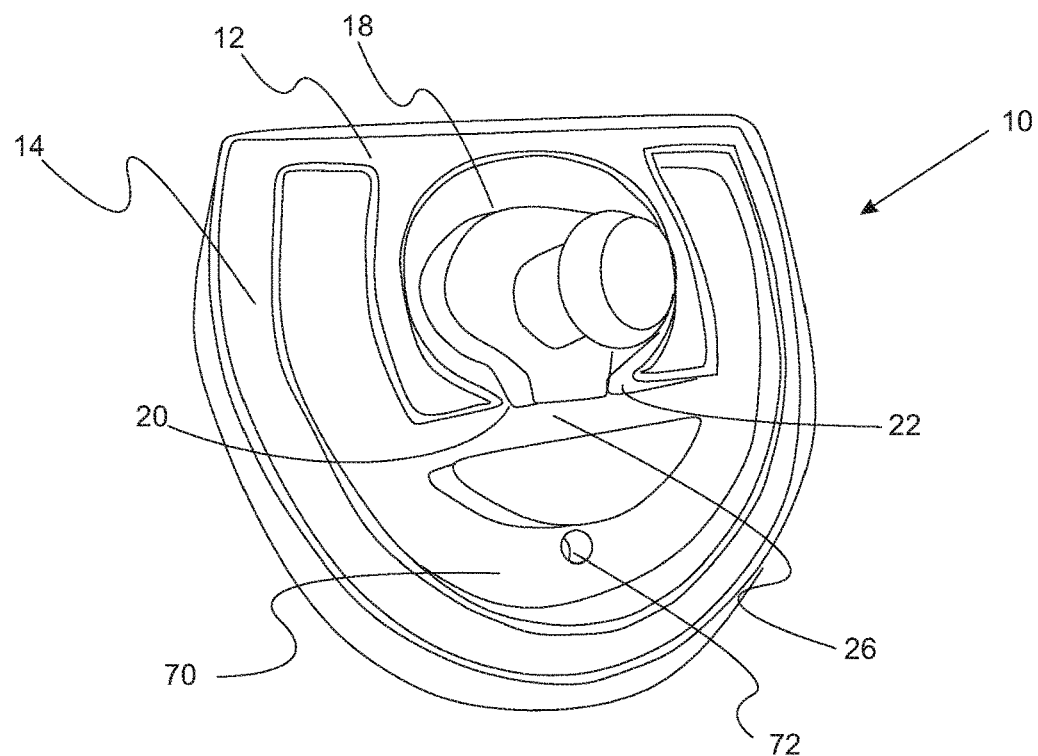
FIG. 4A is a front perspective view of a passive tortuous path drain having three trenched channels and a egress opening that is a hole.
Figure 4B:
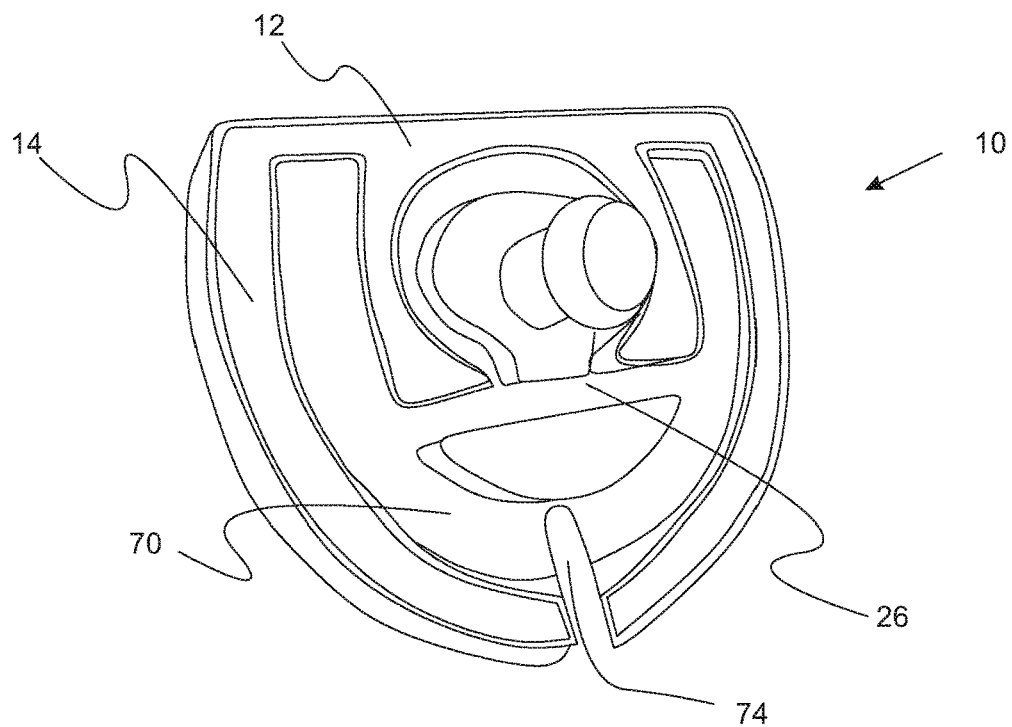
FIG. 4B is a front perspective view of a passive tortuous path drain having three trenched channels and a egress opening that is slot.
Figure 5:
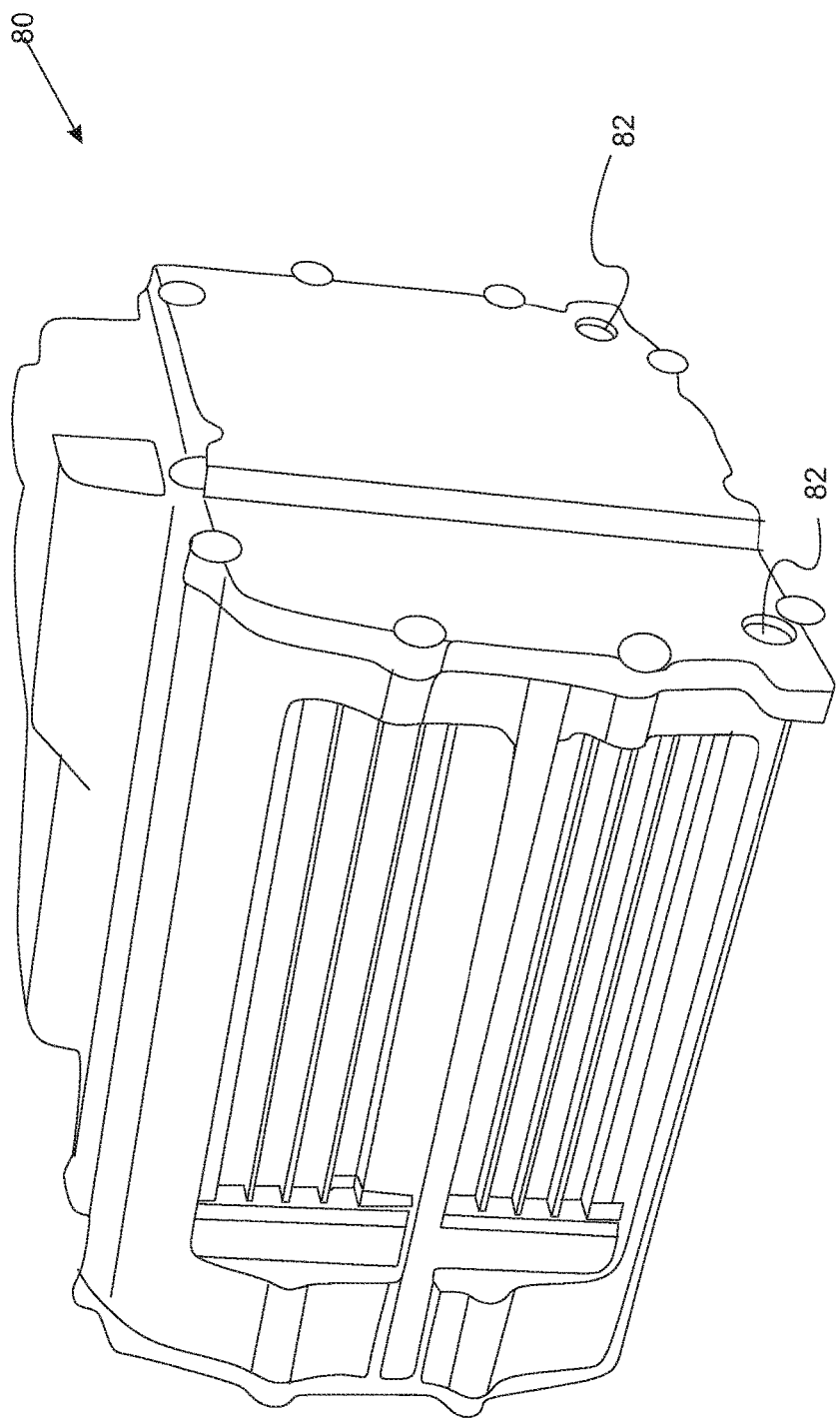
FIG. 5 is a perspective view of an enclosure adapted to receive the passive tortuous path drains set forth herein.

With reference to FIGS. 4A and 4B, perspective views of alternative designs of the drain for removing a liquid (e.g., condensed water) from an electronic enclosure are provided. In each of these variations, passive tortuous path drain 10 includes a drain body 12 having a front face 14 and a back face 16. The front face defines a curved trenched channel 18 having first curved channel end 20 and second curved channel end 22. The front face 14 also defines second trenched channel 26 and a third trenched channel 70. Third trenched channel 70 is in fluid communication with second trenched channel 26. In the version depicted in FIG. 4A, egress opening 72 is a hole positioned in third trenched channel 70. In the version depicted in FIG. 4B, egress opening 74 is a slot positioned in third trenched channel 70.

Figure 6A:
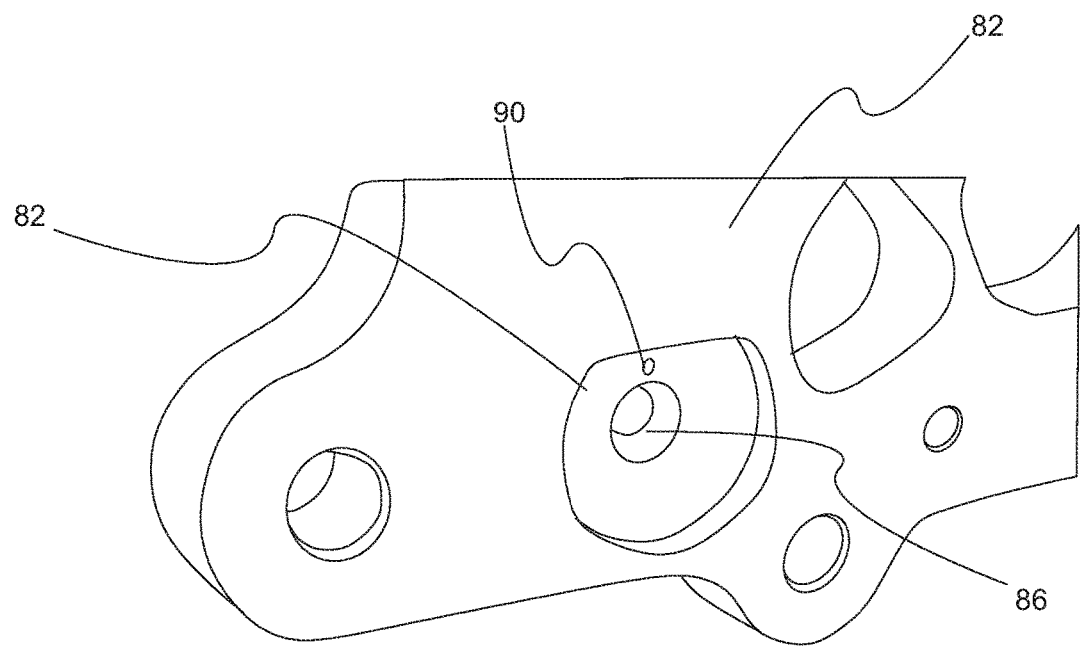
FIG. 6A is a perspective view of an enclosure wall having a receptacle for hold a passive tortuous path drain.
Figure 6B:
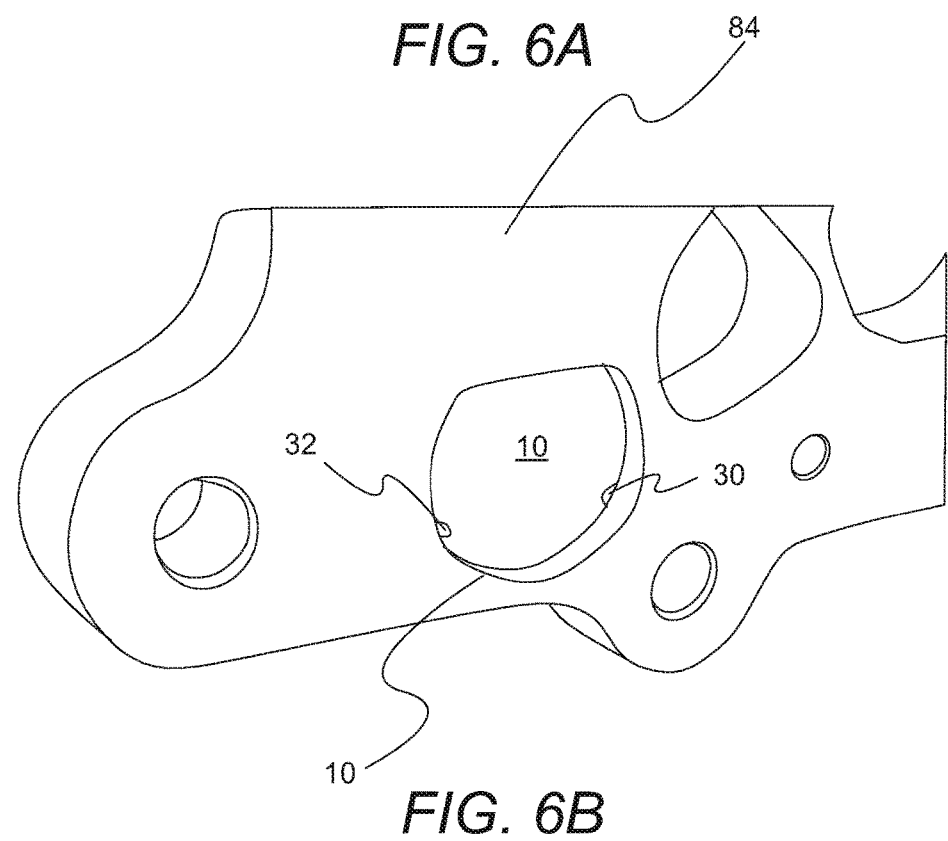
FIG. 6B is a perspective view of a passive tortuous path drain having two egress openings positioned in the receptacle depicted in FIG. 6A.
Figure 7A:
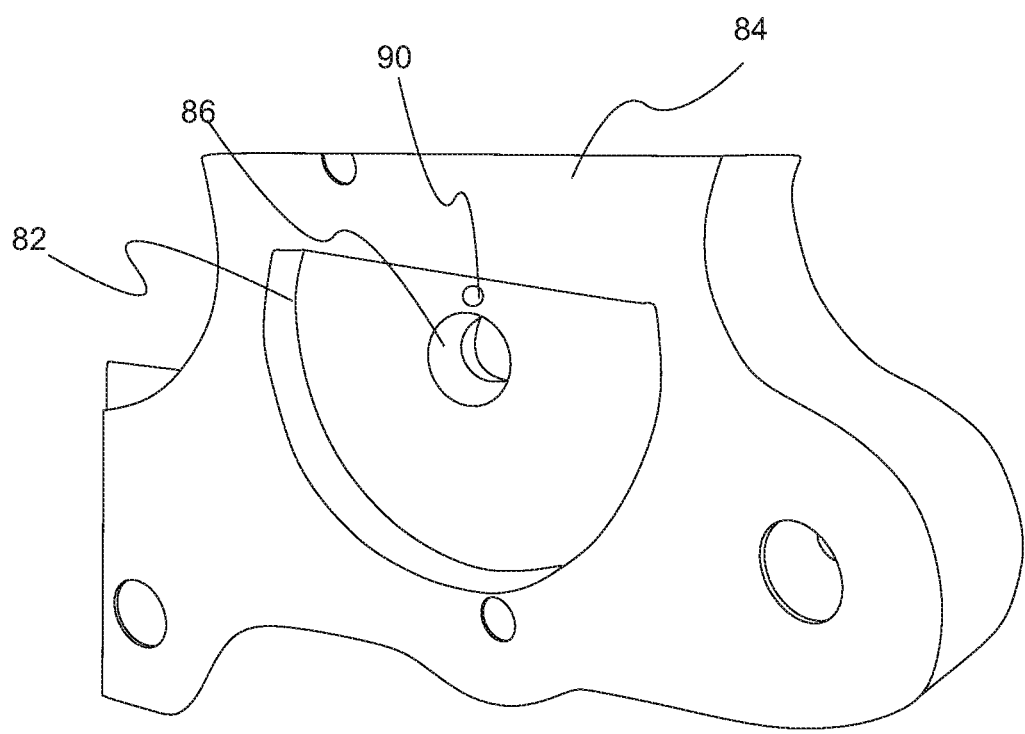
FIG. 7A is a perspective view of an enclosure wall having a receptacle for hold a passive tortuous path drain.
Figure 7B:
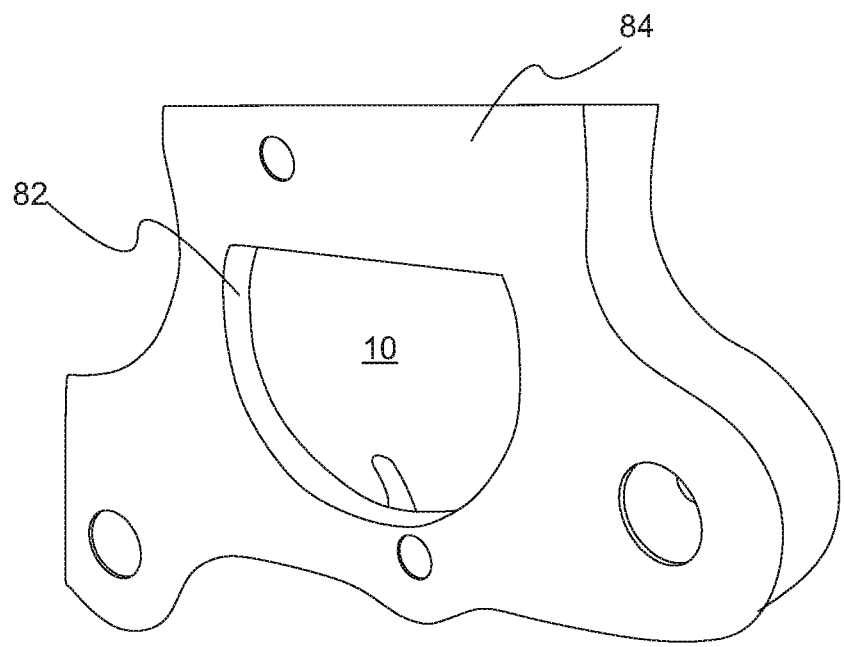
FIG. 7B is a perspective view of a passive tortuous path drain having an egress opening that is a slot positioned in the receptacle depicted in FIG. 7A.

In another embodiment, an electronic system that includes the passive tortuous path drain set forth herein is provided. The electronic system includes electronic components, an enclosure that houses the electronic components, and the passive tortuous path drain. In a particularly useful variation, the electronic components include a plurality of fuel cells arranged in a fuel cell stack. Enclosed fuel cell stack are known to accumulate water toward the bottom of the enclosure. FIGS. 5, 6B, 6B, 7A, and 7B illustrate the drain set forth above integrate into an enclosure used to house electronic components. Characteristically, enclosure 80 includes one or more openings receptacles 82 positioned in enclosure walls 84. In a refinement enclosure 80 includes four receptacles, with one receptacle at each lower corner. Each receptacle 82 includes a retention hole 86 that receives retention feature 36 of FIG. 1 or retention feature 46 of FIG. 3. FIG. 6A show a variation is which receptacle 82 is adapted to receive drain 10 of FIGS. 1A and 1B having egress openings 30 and 32. In this variation water drains from the enclosure through hole 90. FIG. 6B shows drain 10 positioned in the receptacle of FIG. 6A. FIG. 7A show a variation is which receptacle 82 is adapted to receive drain 10 of 4B having egress opening. In this variation water drains from the enclosure through hole 90. FIG. 6B shows drain 10 positioned in the receptacle of FIG. 6A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drain for a directing fluid flow from an enclosure, the drain comprising:
   a drain body having a front face and a back face, the front face defining a curved trenched channel having a first curved channel end and a second curved channel end, the curved trenched channel having a loop shape that defines a central elevated section and a peripheral elevated section, the front face also defining a second trenched channel, the drain body defining at least one egress opening in fluid communication with the second trenched channel, the first curved channel end and the second curved channel end in fluid communication with the second trenched channel, the drain adapted to be positioned adjacent to a drain opening in an enclosure such that liquid flows from the drain opening to the curved trenched channel and then to the second trenched channel exiting through the egress opening; and
   a retention feature that holds the drain to the enclosure, the retention feature extending from the central elevated section.

2. The drain of claim 1 wherein the egress opening is in the second trenched channel.

3. The drain of claim 1 wherein the curved trenched channel is an open sided U-shaped trench.

4. The drain of claim 1 wherein the retention feature is adapted to be held in a retention hole in the enclosure.

5. The drain of claim 1 wherein the retention feature includes a shaft section and a head section, the head section having a larger diameter than the shaft section.

6. The drain of claim 5 wherein the retention feature is split into a first retention section and a second retention section, the first retention section and the second retention section each independently having a head section and a shaft section.

7. The drain of claim 6 wherein the drain body further defines a connecting trenched channel connecting two sections of the curved trenched channel, the first retention section being positioned on a first side of the connecting trenched channel and the second retention section being positioned on a second side of the connecting trenched channel.

8. The drain of claim 5 further comprising an O-ring disposed over the shaft section.

9. The drain of claim 1 wherein the front face further defines a third trenched channel in communication with the second trenched channel.

10. The drain of claim 9 wherein the egress opening is position in the third trenched channel.

11. An electronic system comprising:
    electronic components;
    an enclosure that houses the electronic components; and
    a drain for a directing fluid flow from the enclosure, the drain including a drain body having a front face and a back face, the front face defining a curved trenched channel having a first curved channel end and a second curved channel end, the curved trenched channel having a loop shape that defines a central elevated section and a peripheral elevated section, the front face also defining a second trenched channel, the drain body defining at least one egress opening in fluid communication with the second trenched channel, the first curved channel end and the second curved channel end in fluid communication with the second trenched channel, the drain adapted to be positioned adjacent to a drain opening in the enclosure such that liquid flows from the drain opening to the curved trenched channel and then to the second trenched channel exiting through the egress opening, and wherein the drain further includes a retention feature that holds the drain to the enclosure, the retention feature extending from the central elevated section.

12. The electronic system of claim 11 wherein the electronic components include a fuel cell stack.

13. The electronic system of claim 11 wherein the egress opening is in the second trenched channel.

14. The electronic system of claim 11 wherein the retention feature is adapted to be held in a retention hole in the enclosure.

15. The electronic system of claim 14 wherein the retention feature includes a shaft section and a head section, the head section having a larger diameter than the shaft section.

16. The electronic system of claim 14 wherein the retention feature is split into a first retention section and a second retention section, the first retention section and the second retention section each independently having a head section and a shaft section.

17. The electronic system of claim 11 the front face further defines a third trenched channel in communication with the second trenched channel, the egress opening being positioned in the third trenched channel.

\* \* \* \* \*